Feb. 2, 1971 — R. BEGHI — 3,559,270
DEVICE FOR EXTRUDING AN ANCHORING MEMBER ON A REINFORCING ELEMENT
Filed April 22, 1968

3,559,270
DEVICE FOR EXTRUDING AN ANCHORING MEMBER ON A REINFORCING ELEMENT

René Beghi, Bois Colombes, France, assignor to Societe des Grands Travaux de Marseille, Societe Anonyme, Paris, France
Filed Apr. 22, 1968, Ser. No. 723,110
Int. Cl. B21d 39/04
U.S. Cl. 29—282                                                    1 Claim

ABSTRACT OF THE DISCLOSURE

The disclosure relates to a device for tensioning a prestressed reinforcing element on which the steel socket constituting the anchoring head is drawn.

This device consists essentially of a cylinder-and-piston actuator of which the annular cylinder receives on one side a hollow piston adapted to receive the reinforcing element therethrough, said piston being rigid with a thrust tube adapted to force said anchoring socket through a die fitted in the opposite end of the cylinder for drawing said socket on the reinforcing element.

BACKGROUND OF THE INVENTION

The present invention relates to a device for tensioning prestressed reinforcing elements having drawn thereon the socket constituting the anchoring rod.

It is known that for tensioning certain types of prestressed reinforcing elements a steel socket must be drawn thereon, this socket being subsequently adapted to be firmly connected to a traction cylinder-and-piston unit, possibly after screw-threading the socket. As a rule, this drawing is carried out on the end of the reinforcing element.

However, certain types of prestressed reinforcing elements also provided with a drawn and sometimes screw-threaded socket are tensioned by means of a traction cylinder-and-piston unit acting not on the socket proper but on the cable strands extending through this socket, the latter being intended primarily, after the reinforcing element has been tensioned, for transferring the stress introduced into the reinforcing element to the concrete mass, with the interposition of a suitable bearing member (plate, key, nut, etc.).

SUMMARY OF THE INVENTION

It is the essential object of the present invention to provide a device for drawing an anchoring socket or sleeve on the strands of a cable or cluster of cables, and more particularly a barrel-shaped socket or sleeve, that is, a member formed with preferably parallel and concentric longitudinal through recesses, receiving therethrough the cable strands or the different cables of a cluster.

This socket is firstly positioned on the cable, then brought to a position of abutment between a thrust tube and adequate abutment members locked on the cable and keeping the strands at spaced intervals. The socket is drawn on the cable by forcing the socket in a known manner through a die. This thrust is produced by means of the aforesaid thrust tube rigid with the piston of an annular cylinder actuator through which the reinforcing element extends co-axially.

The outer surface of the socket thus extruded on the strands of the reinforcing element can subsequently be screw-threaded.

BRIEF DESCRIPTION OF THE DRAWING

A typical form of embodiment of this device for drawing an anchoring member on a cable will now be described more in detail with reference to the attached drawing, in which.

DESCRIPTION OF THE PREFERRED EMBODIMENT

Figure 1:
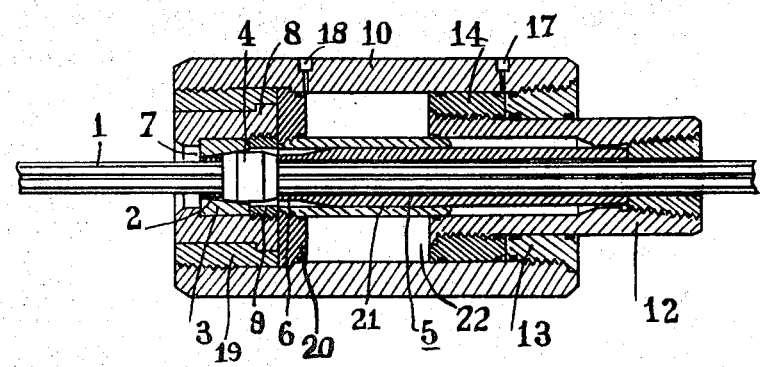
FIG. 1 is a sectional view showing the socket positioned on the cable, before the drawing step.

The drawing device according to this invention comprises essentially an annular cylinder 10, such as a press cylinder or a hydraulic actuator, of which the piston 12, 14 formed with an axial through passage is adapted to be moved by the hydraulic pressure exerted in the duct 17 and tending to elongate the chamber 16 between the ring 13 screwed in one end of the cylinder and the head 14 screwed on the rod of piston 12; this piston is adapted to drive or carry along a thrust tube 5. One end 6 of this thrust tube 5 engages the anchoring socket or sleeve 4 positoned on the cable or reinforcing element 1 by means of abutment members 2 adapted to keep the strands in proper spaced relationship.

Figure 2:
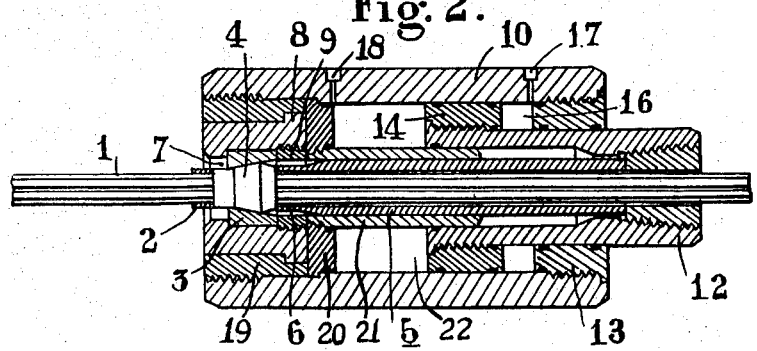
FIG. 2 is a similar view showing the position of the parts during the drawing step.
Figure 3:
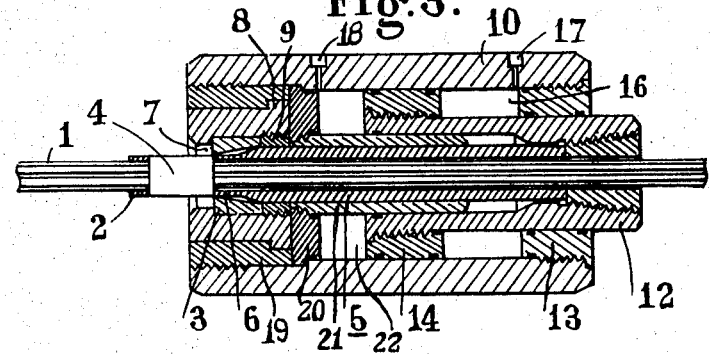
FIG. 3 is a similar view showing the same parts upon completion of the drawing step.

Fitted in the axial cavity 7 inside jaws 8 secured to the opposite end of cylinder 10 is a die 3 having a frusto-conical contour, the socket or sleeve 4 being driven through this die 3 for drawing the former on the cable in a manner known per se (FIG. 2). The jaws 8 are held fast by a fixing sleeve 19 which is screwed into the cylinder 10 which ring 19 serves as a stop element for an annular bottom 20 which is fast with a tubular projection 21 which guides the thrust tube 5 and defines, between the annular bottom 20 and the piston head, 14 an exhaust chamber 22 which communicates, by means of duct 18, with an hydraulic reservoir. A small threaded ring 9 engaging a threaded inner portion of jaws 8 locks the die 3 in said jaws.

As it emerges from the calibrated die 7, the socket or sleeve 4 is firmly positioned and anchored on and in the cable, if desired with the interposition of indentation lock springs (not shown).

With this device, the anchoring socket or sleeve can be secured to any desired point along a reinforcing element extending through it, notably for carrying out the method of anchoring prestressed reinforcing elements wherein the strands of the reinforcing element must emerge from the socket.

Of course, different details may be modified or varied when carrying out the invention, without departing from the spirit and scope thereof as set forth in the appended claim.

What I claim is:
1. Hydraulic actuator of the cylinder and piston type for drawing a multistrand reinforcing element on a barrel type anchoring metal socket surrounding said reinforcing element, which comprises a cylinder having a front end and a rear end, both open and internally screw-threaded, an annular front bottom, a tubular axial extension of said annular bottom screwed at the rear of said annular bottom, said annular bottom being engaged into the font opening of said cylinder to an abutment position, a fastening sleeve screwed in the front opening of said cylinder and locking said annular bottom in its abutment position, jaws engaged in the aforesaid fastening sleeve so as to engage said annular bottom, a die member having an outflared frustoconical surface with the wide end at the rear, which is engaged in said jaws in a forward abutment position, a lock ring screwed in the rear portions of said jaws and locking said die in its forward abutment position in which it comprises an anchor bolt also slipped on said multistrand reinforcing element, a piston having an internally screw-threaded annular head, said piston being slidably mounted in said cylinder at the rear of said front annular bottom, and a tubular piston rod slidably mounted on said tubular extension of said annular bottom, said piston rod having an externally screw-threaded front end screwed on said piston head and an internally screw-threaded rear end extending outside said cylinder, a cylindrical axial journal member screwed in the rear opening of said cylinder and slidably engaged by said piston rod, a bearing member formed with an axial passage and screwed in the rear end of said piston rod, a tubular push member having a rear end against said bearing member and a front portion slidably engaged in the tubular axial extension of the front annular bottom of said cylinder, said push member terminating with a bearing end registering with said die member, said front annular bottom and its tubular axial extension forming in said cylinder in conjunction wth said piston a front chamber communicating with a source of compressed fluid through ducts formed radially in said cylinder at the rear of said front annular bottom, said piston head and said piston rod forming on the other hand in said cylinder in conjunction with said cylindrical axial journal member a rear chamber communicating with said source of compressed fluid through radial ducts formed in said cylinder forwardly of said cylindrical journal member, the supply of compressed fluid to said rear chamber permitting, through the medium of said piston head, said bearing member and said tubular push member, of moving said anchoring metal socket forwards until, after having passed through said die member, it is rigidly assembled by drawing to said multistrand reinforcing member so that said multistrand reinforcing member provided with its anchoring socket can be released in the forward direction, the supply of compressed fluid to said front chamber subsequently controlling the backward movement of said piston and the release of the tubular push member at the rear of said die member.

References Cited

UNITED STATES PATENTS 3,356,397   12/1967   Bagby _____ 287—78

FOREIGN PATENTS 312,774   4/1956   Switzerland.
363,464   9/1962   Switzerland.

CHARLES W. LANHAM, Primary Examiner

A. L. HAVIS, Assistant Examiner

U.S. Cl. X.R.

72—253; 29—520, 203, 517